May 5, 1953 H. J. WOOCK 2,637,052
TAPPING MACHINE
Filed April 4, 1949 2 SHEETS—SHEET 1
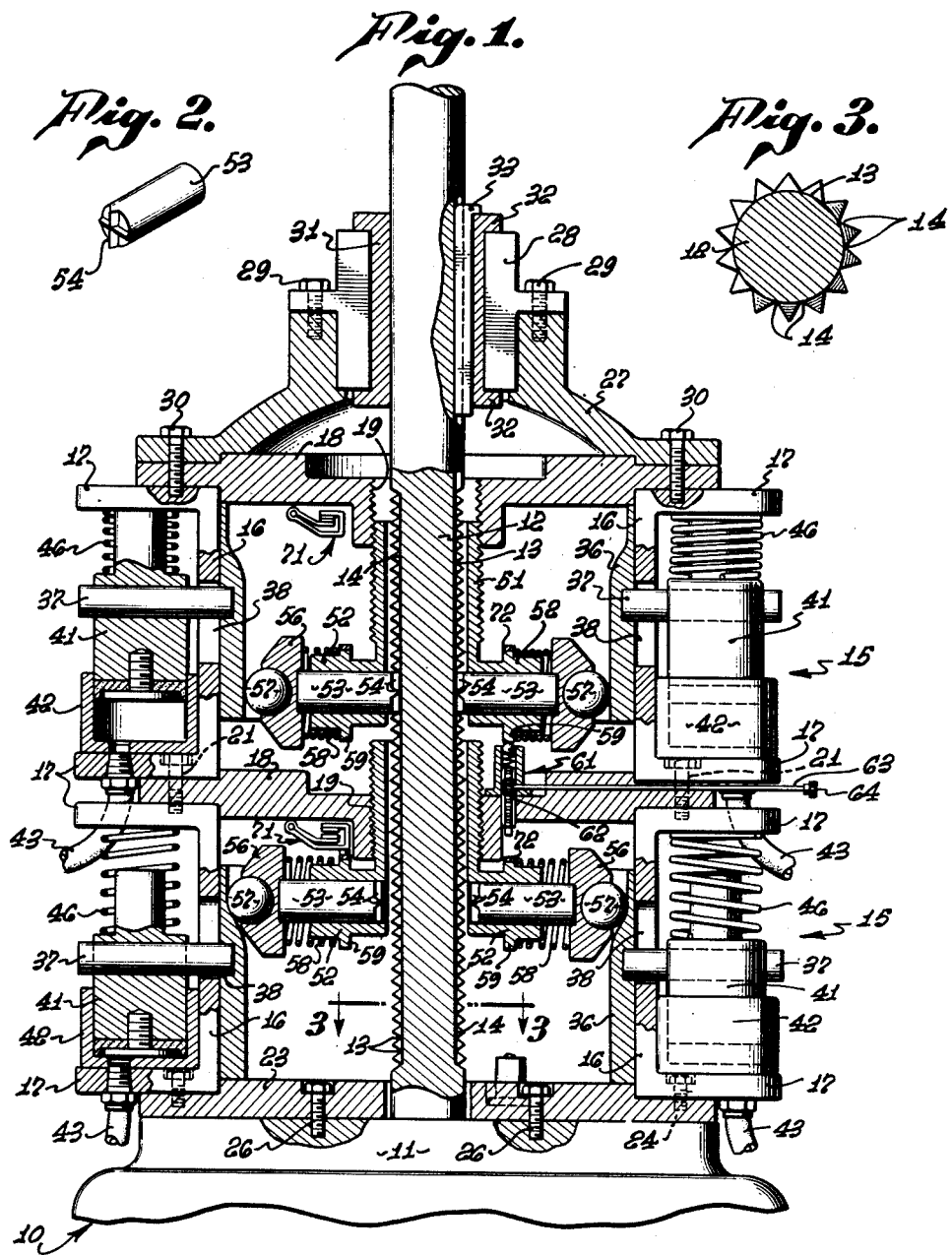
INVENTOR.
HERBERT J. WOOCK,
BY
ATTORNEY.

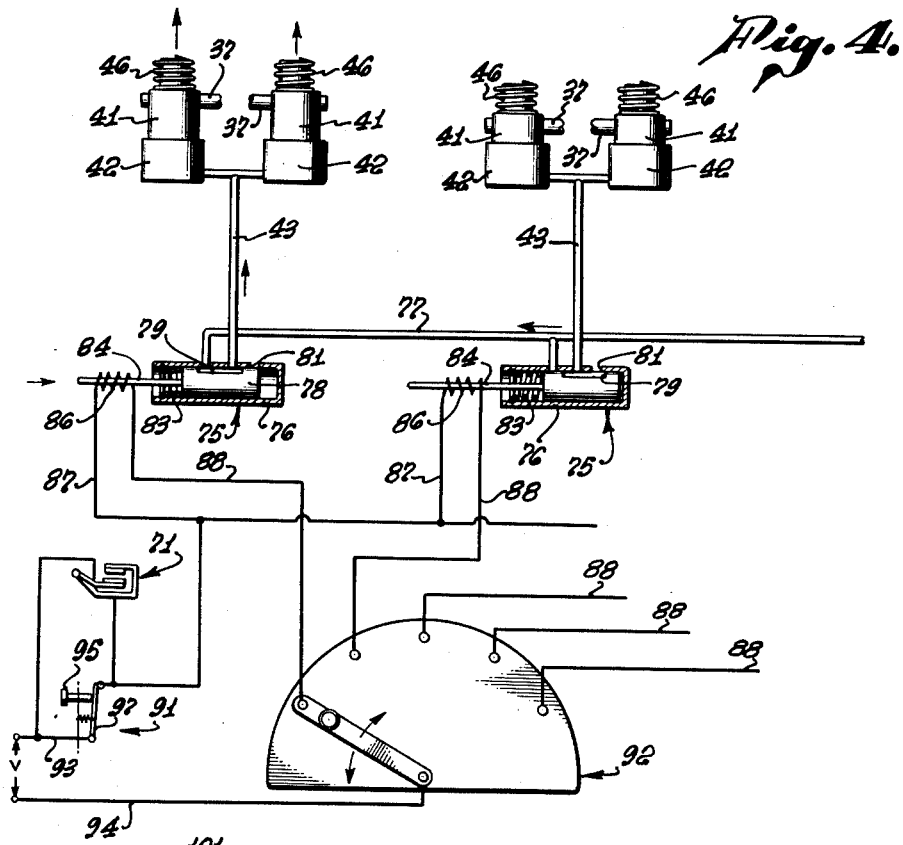

Patented May 5, 1953

2,637,052

UNITED STATES PATENT OFFICE 2,637,052

TAPPING MACHINE

Herbert J. Woock, Arcadia, Calif.

Application April 4, 1949, Serial No. 85,431

13 Claims. (Cl. 10—139)

The present invention relates to tapping machines in general and includes attachments by which drill presses, screw machines, lathes and the like can be converted into tapping machines. More specifically the invention comprises a tapping machine incorporating a plurality of leadscrews which may be selectively connected in operative relationship to the rotary spindle at any position within its range of longitudinal displacement to enable the machine to cut threads of different pitch at any spindle projection.

Holes may be tapped by the operation of hand- or power-driven tapping machines. Any power-driven drill press or rotary machine can function to tap holes by the use of a proper holding fixture by which the tap is secured to the machine spindle. Where holes are tapped by such machines, and the tap functions to draw itself into the hole at the same time it cuts the thread, it is found that the thread is not perfect. This is particularly true in tapping holes in certain metals and while the resulting thread may be acceptable for ordinary work it is not sufficiently accurate for precision work.

To provide the requisite thread accuracy for precision work special tapping machines have been designed, and also special attachments have been provided for drill presses and the like, which employ a leadscrew to advance the spindle and the tap carried thereby into the work. The leadscrew has a pitch duplicating the pitch of the thread of the tap being used so that the tap functions only to cut the thread and does not draw itself into the hole, the advance being provided by the leadscrew. Threads so made can be perfect but heretofore certain difficulties have been present in the machines and in such attachments.

The majority of the special tapping machines of the type referred to are designed especially for reaming and tapping only. This means that the hole to be threaded must be drilled by some other machine and then removed to the tapper for the reaming and tapping operation. Accordingly at least two machines are required thereby materially increasing the opportunity for errors and misalignments which result in inaccurate threads. Clearly a hole threaded by a tap not perfectly aligned will not be a perfectly tapped hole. It is equally clear if the part to be tapped is removed from a first holding fixture in which it was drilled and then placed in a second fixture in another machine for purposes of tapping the opportunity for misalignment is increased.

Frequently it is necessary to tap several holes in one part which holes may be of different sizes and which may require threads of different pitch. In the conventional machine it is necessary to change the leadscrew at the expenditure of an appreciable time. Alternatively, if more than one piece is to be tapped all the holes of one size may be tapped in the various pieces with one leadscrew in place, the leadscrew changed, and the pieces again passed through the machine and the next hole tapped. In the one case an undesirable expenditure of time is required for each change of leadscrew while in the other case the possibility of error is greatly increased.

Where conventional tapping attachments are used on drilling machines it is possible in many instances to drill, ream, and tap in one fitting to provide increased accuracy. But here also where more than one size of hole or pitch of thread is encountered it is necessary to remove the attachment, make a change of leadscrew therein, and then replace it.

An additional problem is encountered in the special tapping machines or in the special tapping attachments now available where the holes to be drilled and tapped are not on the same level. The leadscrew has a limited range of movement and with the adjustment of the rotary spindle to accommodate work at various levels the range of the leadscrew may be and frequently is exceeded. A single replaceable leadscrew is attached directly to the spindle in all accepted special tapping machines and in all accepted special tapping attachments now on the market. Accordingly, and while tapping with such machines and attachments, it is necessary to restrict spindle displacement to the range of the leadscrew which correspondingly restricts the range of travel toward and into the work.

With an appreciation of the problems present in tapping machines and in attachments by which other machines are converted for tapping purposes, and also with an appreciation of the defects characterizing such apparatuses heretofore upon the market, it is an object of the present invention to provide a new and improved tapping machine characterized by its ability to tap in all longitudinal positions of the rotary spindle.

It is another object of the invention to provide a new and improved tapping attachment for drill presses and the like capable of selectively controlling the advance of the tap-carrying spindle into the work.

Still another object of the invention is to provide a tapping machine in which the tap-carrying spindle is selectively advanced into the work at a rate determined selectively by the operator.

A further object of the invention is to provide a tapping machine in which the tap-carrying spindle is selectively connectible to various leadscrews of various pitches in all of its longitudinal positions.

Another object of the invention is to provide a tapping machine in which a longitudinally displaceable tap-connected spindle is selectively connectible to leadscrews of various pitches throughout its entire range of axial displacement.

A still further object of the invention is to provide a tapping machine in which the driven spindle is selectively connectible in all of its longitudinal positions to a plurality of leadscrews spaced along its length.

Still another object of the invention is to provide an attachment for machine tools, such as drill presses incorporating a rotatable spindle, including a plurality of leadscrews arranged to engage the spindle or an extension thereof and to be selectively connected thereto.

A further object of the invention is to provide a tapping attachment for the conversion of drill presses and the like into tapping machines capable of cutting threads of various pitches.

A still further object of the invention is to provide a tapping attachment for machines, such as drill presses and the like, by which such machines are rendered capable of advancing their spindles into the work at a rate corresponding to the pitch of the tap being used, the attachment being characterized by its ability to incorporate additional leadscrews as desired by the operator.

These and other more specific objects will appear upon reading the following specification and claims and upon considering in connection therewith the attached drawings to which they relate.

Referring now to the drawings in which preferred embodiments of the invention are illustrated:

Figure 1 is a vertical section through a tapping attachment constructed in accordance with the present invention mounted upon a machine such as a drill press;

Figure 2 is a perspective view of one of the clutch dogs by which the leadscrews are connected to the rotary spindle;

Figure 3 is a transverse section through the spindle upon the line 3—3 of Figure 1;

Figure 4 is a schematic diagram of the control circuit by which the leadscrews are selectively connected to the rotating spindle by hydraulically actuated means;

Figure 5 is a schematic diagram of a modified control circuit in which the hydraulic actuating means of the circuit of Figure 4 are replaced by electrical means; and Figure 6 is a schematic diagram of the circuit for the driving motor by which its direction of rotation is controlled.

In the drawings a power-driven machine is indicated generally by the reference character 10 and the driven rotary spindle, or a connected extension thereof, indicated by the reference character 12, extends upwardly through its top plate 11. Machine 10 may be a drill press or similar machine of the type incorporating a rotary shaft or spindle, and while in the illustrated form is shown with a vertical shaft it is to be understood that its axis can as well be horizontal or inclined. The spindle 12 may be of the machine shaft or an extension fixedly connected thereto and in effect integral therewith. For reasons which will be made clear the spindle is provided upon its surface with adjacent circumferential grooves 13, the sides of which in a preferred form taper at angles of thirty degrees to a normal plane. It is also provided with circumferentially spaced longitudinal grooves or channels 14, as illustrated in Figure 3, which may also be referred to as flutes. The longitudinal and circular grooves intersect and as both are relatively small and closely spaced the exterior surface of the spindle appears as small pyramids arranged in straight rows both longitudinally and circumferentially.

At the unshown lower end of spindle 12 would normally be positioned a conventional quick change chuck adapted to hold drills, reamers, and taps as desired. The tapping attachment is positioned upon the top of machine 10 resting upon the top plate 11. It in fact comprises a plurality of similar stacked units, two in the illustrated embodiment, although it is to be understood that the number can be increased as desired. The units are indicated generally by the reference character 15 and each includes a principal frame, casing or housing member 16 encircling spindle 12 in spaced relationship preferably, but not necessarily, circular. Casing members 16 are provided top and bottom with outwardly extending brackets or flanges 17. Each unit 15 also includes a top member or plate 18 fixed to the upper flange of each casing 16 and centrally bored and threaded at 19 to function in each instance as a fixed nut for a cooperating leadscrew to be described. Accordingly, the plate may be referred to as the leadscrew nut.

Where the top and bottom of two units 15 abut, the top plate 18 of the lower unit also functions as the bottom plate for the upper unit, the two units being held in assembled relationship by threaded bolts 21 which extend between apposed flanges 17 and through the intermediate plate 18. The lower unit 15 is secured to a bottom or attachment plate 23 by means of bolts 24, the plate in turn being secured by bolts 26 to the top plate 11 of machine 10. Upper unit 15 carries a cover 27 the peripheral flange of which is secured by bolts 30 to the adjacent top plate 18 and with the latter to the adjacent casing 16. The cover is provided with a central cylindrical sleeve portion seating the outer part 28 of a bearing having a circumferential flange mounted on the end of the cover sleeve by bolts 29. Bearing part 28 can be and preferably is formed of two halves.

The cooperating inner part of the bearing is indicated by the reference character 31 and is provided with end flanges 32 abutting the ends of outer bearing part 28 to prevent its own axial displacement. Bearing part 31 rotates with spindle 12 being keyed thereto by a key 33 seated within an extension of one of the longitudinal flutes 14. Key 33 being slidable in the flute provides a relationship in which the bearing inner part 31 rotates with the shaft while permitting the shaft to be displaced longitudinally.

Within each casing 16 of each unit 15 is slidably mounted a cam 36. The inner surface of the cam must be circular and is seen to have a large diameter upper end and a small diameter lower end, the surfaces of different diameter being connected by a sloping surface. The outer surface of cam 36 seats slidably in the frame 16 and conforms to the supporting surface thereof. If the supporting surface of frame 16 is circular then the outer surface of cam 36 would correspond. The exact configurations are not of the essence so long as the cam is slidable in the frame in a direction parallel to the longitudinal axis of spindle 12. In its uppermost position cam 36 abuts the overlying top plate 18 and in its lower position the unit bottom plate, formed in an upper or intermediate unit by the top plate 18 of the unit below, and in the lowermost unit by a bottom plate 23.

A plurality of laterally extending trunnions 37 are fixed in each of the cams 36 and extend outwardly through slots 38 in the enclosing frame or casing 16. The outer end of each trunnion is fixed to a piston 41 of a pressure-actuated hydraulic ram which includes a cylinder 42 mounted fixedly upon the bottom flange 17 of the adjacent casing 16. Each cylinder is connected by a conduit 43 to a source of fluid under pressure, either liquid or gas, and each piston 41 includes a sealing gasket at its inner end which provides a fluid-tight fit within the cylinder. The piston 41 is normally retained, in the absence of fluid under pressure within the cylinder 42, at its innermost position under the force exerted by an abutting concentric coil spring 46 seated between it and the overlying frame flange 17. This innermost and normal position is illustrated in the lower unit 15 of Figure 1 and it is to be noted that with the piston so positioned the trunnion 37 has moved the cam 36 downwardly to its lowermost position. In the upper unit 15 of Figure 1 the pistons 41 are illustrated in their upper or outer positions in which they are retained by fluid under pressure within cylinder 42 and against the action of springs 46 which are compressed. In this position the pistons 41 have moved the connected cam 36 to its uppermost position.

Each unit 15 includes a leadscrew 51 formed as an externally threaded sleeve rotatably seated within the threaded bore 19 of the unit leadscrew nut 18. Leadscrews 51 extend concentric to and in spaced relationship with spindle 12 being provided at their lower ends with laterally extending centrally bored bosses forming seats 52 for radially extending clutch dogs 53 slidably positioned therein. Each dog 53 is provided at its inner end with transversely extending V-shaped ribs 54 adapted to mesh with longitudinal and circumferential spindle grooves 13 and 14. At its outer end each dog has a fixed enlarged head 56 which encloses and rotatably seats a ball bearing 57. A concentric coil spring 58 is positioned between each head 56 and a circumferential flange 59 upon a dog seat 52 and at all times exerts a force to urge the dog radially outwardly from the spindle 12 and the bearing 57 against cam 36. With cam 36 in its lower position, as illustrated in the lower unit 15 of Figure 1, the balls 57 abut the cam surface of larger diameter and the inner end of the dog is disengaged from the spindle. In upper unit 15 the balls are shown in contact with the lower small diameter surface of the cam and have been moved radially inwardly, the springs 58 being compressed, and the ribs 54 engage the spindle. In the latter relationship the leadscrew 51 is connected by the dogs to the spindle 12 and rotates therewith, advancing upwardly or downwardly within its nut 18 depending upon the direction of spindle rotation.

To reverse the direction of spindle rotation after the leadscrew 51 has advanced its full travel downwardly there is provided a limit switch, generally indicated by the reference character 61, which may be of conventional design and includes rack-and-pinion positioning means 62 by which it can be positioned relatively to its carrying plate 18 under the control of a rotatable rod 63 extended transversely to the exterior of the attachment where it carries a knurled head 64. Switch 61 is so positioned as to be contacted and closed by the circumferential flange 59 of the dog seat 52 as the leadscrew moves downwardly to its lowermost position whereupon the driving motor is reversed. The electrical circuit for this control is shown in Figure 6 in which the driving motor for the spindle 12 bears the character M and is seen to be connected to a reversing switch 66 the position of which is controlled by a solenoid 67 the winding of which is in series with a plurality of limiting switches 61 which are connected in parallel. With motor M energized and rotating in one direction, as for example to advance leadscrew 51 downwardly, the spindle continues its rotation until switch 61 is closed as described whereupon solenoid 67 is energized, reverses switch 66, and instantly motor M will reverse its direction of travel. Spindle 12 then returns the leadscrew to its initial position. The cycle of leadscrew travel is from the position illustrated in the lower unit 15 of Figure 1 to the position shown in the upper unit of the same figure and then back to the first position. Reversing switch 66 is provided with a manually operable push button 69 by which the operator can manually reverse the direction of motor travel independently of the operation of limit switch 61.

Upon the return of the leadscrew to its starting position it must be declutched from the spindle and the dogs 53 moved to their outer positions. This is accomplished by releasing the fluid pressure within the ram cylinders 42 under control of a limit switch, indicated generally by the reference character 71, positioned immediately below the unit top plate 18 in position to be contacted and closed by the contact of a circular ring 72 fixedly carried by the dog seats 52. As the ring 72 is continuous it can contact and open the switch in any arcuate position of the leadscrew.

In Figure 4 the control circuit for the pressure-actuated ram units is illustrated and the flow of fluid under pressure through the conduits 43 to the cylinders 42 in each unit 15 is seen to be under the control of a valve unit generally indicated by the reference character 75. Each unit 75 comprises a cylindrical casing 76 supplied with fluid, either liquid or gas, under pressure through a conduit 77 from any suitable source or pressure-creating means. Each of the conduits 43 from the ram units of a particular unit 15 connects to the cylinder 76 within which moves a piston valve 78 formed with a circumferential port 79 adapted to connect the conduit to either the incoming pressure conduit 77 or to the exhaust port 81 leading to atmosphere. A coil spring 83 at all times urges each piston 78 to an end position in which it connects the conduit 43 to the port 81 to release the pressure within the ram unit. A connecting rod 84 on each piston also functions as the armature of a solenoid in which the winding 86 is so wound that when energized the piston 78 is displaced to the left, as viewed in Figure 4, to effect the closing of port 81 and the connection of conduit 43 to the pressure-carrying conduit 77. With the valve so positioned the connected ram units are pressurized and their pistons 41 move from the position shown in the lower unit of Figure 1 to the position illustrated in the upper unit of the same figure.

The current-conducting leads 87 and 88 to each solenoid winding 86 connect respectively to a manually operable switch unit, indicated generally by the referenc character 91, and to a selector switch indicated generally by the reference character 92. Those switches are in turn connected through leads 93 and 94, respectively, to a suitable source of electrical potential.

Selector switch 92 includes a manually adjustable contact adapted to close upon one of a plurality of stationary contacts each of which is connected to its own lead 88 leading to solenoid windings 86 of valves 75 controlling the pressure-actuated ram units of different units 15. Depending upon the kind of thread to be tapped the operator positions the selector switch movable contact as to connect electrically the solenoid of the valve 75 operatively associated with that unit 15 having a leadscrew corresponding to that thread. In Figure 4 two units 15 are shown as connected by leads 83 to the selector switch. Additionally a plurality of leads 88 are illustrated which would be connected to additional units 15 in a machine having a wider range of use.

Manually operable switch 91 controls the actual clutching of the leadscrew to the spindle after the operator has selected the unit 15 to be actuated. Switch 91 may be a conventional normally open switch including a blade 97 normally spring-held in open position and adapted to be closed by a push button 95. Limit switch 71 is connected in parallel with switch 91 and is closed instantly by the leadscrew displacement effected by the closing of the latter. The operator may then release push button 95 so that switch 91 returns to open position, the flow of current continuing to pass through switch 71.

In the operation of the described embodiment of the invention let it be assumed that the tapping attachment is positioned upon a drill press or similar machine 10 as illustrated in Figure 1. Let it also be assumed that the work is securely positioned at the lower end of spindle 12, or its extension, has been drilled and reamed, and that it is desired to tap the hole with a thread corresponding to the pitch of leadscrew 51 of upper unit 15. As illustrated in Figure 1 the upper unit has already controlled a tapping operation and is just about to operate limit switch 61 so that the driving motor M will be reversed and the leadscrew fed back to its initial position. Let it be assumed, however, that the hole is untapped and that the leadscrews of both units 15 are in their upper positions illustrated in the lower unit 15.

The operator positions the control lever of selector switch 92 as illustrated in Figure 4 so that current will be conducted to the solenoid winding 86 controlling that valve 75 operatively associated with the ram units forming a part of the upper leadscrew unit 15. All of the upper limit switches 71 are held in open position by the contact of the various leadscrew-carried rings 72. The machine being in operation and spindle 12 rotating the operator pushes button 95 whereupon normally open switch 91 is closed and winding 86 of the valve solenoid energized. Valve piston 78 is moved from its normal inoperative position, shown in the right-hand unit of Figure 4, to the position shown in the left-hand unit so that fluid under pressure from conduit 77 is directed through port 79 and connects conduit 43 to the ram cylinders 42. Ram pistons 41 of upper unit 15 are thereupon forced upwardly from their normal inner position, in which they are held by springs 46 illustrated in the lower unit 15 of Figure 1, to their upper position. As the cam 36 is connected to the pistons by trunnions 37 it moves upwardly therewith. The balls 57 ride from the upper cam portion of maximum internal diameter onto the lower portion of lesser diameter and the dogs 53 are forced inwardly. The inner end of each dog, and specifically its ribs 54, engages the circular and longitudinal grooves in spindle 12 whereupon they, their carrying seats 52, and the leadscrew 51 integral therewith, rotate as a unit with the spindle.

At the time of the closing of the clutch of upper unit 15 its leadscrew 51 was in its uppermost position. With the spindle 12 rotating in the proper direction to perform the tapping operation the leadscrew advances downwardly, that is, toward the machine 10. As the leadscrew is locked by the dogs 53 to the spindle 12 the latter also advances downwardly forcing the tap at its lower end into the hole being tapped. The vertical displacement of spindle 12 in its upper bearing is permitted by the sliding movement of the key 33 in an extended flute in which it is positioned. Limit switch 71 closes instantly as the contact ring 72 moves therefrom effecting the closing of the circuit in parallel with the manually operable switch 91 which could then be opened by the operator releasing button 95.

As the leadscrew reaches its lower position, a variable determinable by the operator through the rotation of knurled knob 64, the limit switch 61 is closed. As is illustrated in Figure 6 this immediately causes current to flow through the winding of the solenoid 67 controlling reversing switch 66 which thereupon is reversed to effect the reversal of the direction of rotation of driving motor M. Spindle 12 then rotates in the opposite direction.

As spindle 12 and leadscrew 51 remain clutched together for conjoint movement the latter also reverses its direction of travel and moves from its lower position illustrated in the upper unit 15 of Figure 1 to its uppermost position as illustrated in the lower unit. As it moves into this uppermost position limit switch 71 is again opened by the contact of ring 72 whereupon the flow of current through winding 86 of the solenoid controlling valve 75 is cut off. Immediately spring 83 acting upon the valve piston 78 forces the latter from its operative position, as illustrated in the left-hand unit of Figure 4, to its inoperative position illustrated in the right-hand unit. In the latter position, it is noted, conduit 43 connects the ram units directly to atmospheric port 81 through the piston port 79. The pressure within the previously energized ram units is thereupon released and, under the actuation of coil springs 46, each piston 41 of the previously actuated ram units of upper unit 15 travels from its position as illustrated in Figure 1 to the position illustrated in the lower unit 15. In its travel the piston 41, more accurately the pistons 41, again carries the cam 36 which, as it travels downwardly, permits the dogs 53 to move outwardly as the balls 57 roll from its surface of minimum internal radius to that of maximum radius. Under the actuation of coil spring 58 dogs 53 move outwardly and disengage themselves from the spindle which thereupon rotates freely.

The entire machine is now returned to its initial relationship with the exception that spindle 12 is rotating in the reverse direction. The operator can again reverse the direction of rotation by depressing push button 69 connected to reversing switch 66 which effects the return of that element to its original relationship and again reverses the direction of travel of motor M so that the described operation can be repeated upon the next hole to be tapped.

Referring now to Figure 5 in particular a modified control circuit is illustrated which may be considered as identical to that illustrated in Figure 4 with the exception that the hydraulic features have been eliminated and the valve-actuating solenoid winding 86 replaced by a winding 101 acting directly upon the piston 41. In the first embodiment the energization of winding 86 positioned valve unit 75 so that the fluid under pressure actuated the ram piston. In this embodiment the energization of a pair of windings 101 acts upon the pistons 41 connected to the cam 36 and positions it directly rather than by acting through the intermediary of the fluid-pressure-actuated means. In other respects the characteristic and operation of this modified form are identical to that first described.

The provision of the operator-adjustable control for the circuit switch 61 of each leadscrew unit 15 enables the operator to vary the travel of the tap carried by spindle 12 or its extension. The presence of a plurality of units 15, as previously described, makes unnecessary the disassembly of the machine, in fact makes unnecessary any mechanical change in the machine, to render it operable to tap threads of different pitch. The stacked construction makes it possible to extend the field of usefulness of the machine by adding additional leadscrew units 15 to those already present in the machine. Each unit is independently operable and can be clutched to the spindle at any place along the length of the latter thereby greatly increasing the flexibility of the machine in use through enabling it to tap holes at differing heights. In the illustrated embodiment of the invention is an attachment mounted on a drill press or similar tool, but the principles involved are applicable to constructions incorporated in a tapping machine as a permanent part.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a tapping machine of the type including a body and a driven rotary tap-connected spindle carried thereby for rotation and for axial displacement, a plurality of leadscrew units to move said spindle axially spaced therealong and each including a rotatable leadscrew having threads of a different pitch than that of the leadscrews of the other units and also including a fixed leadscrew nut seating said leadscrew, clutch means carried by each of said leadscrews including a movable element engageable in one position with said spindle to effect its conjoint rotation and longitudinal displacement with the connected leadscrew, cylindrical cam means concentric to said spindle and having cam surfaces of different diameters to abut said element and determine its position relative to said spindle, said element traveling circularly in abutting contact with said cam when in engagement with said spindle, and operator-controlled means to effect the displacement of said cam means longitudinally of said spindle to move said element relative thereto.

2. The construction recited in claim 1 characterized in that means are provided to reverse the direction of rotation of said spindle after conjoint rotation with said connected leadscrew effecting a predetermined displacement of said leadscrew relative to said nut and an equivalent longitudinal displacement of said spindle.

3. The construction recited in claim 2 characterized in that means are provided to effect the displacement of said cam to disengage said element from said spindle upon the return of said connected leadscrew to its initial position following the reversal in direction of rotation of said spindle.

4. An attachment for the conversion of a drill press or the like having a rotary axially displaceable spindle into a tapping machine, comprising a plurality of separable leadscrew units secured in stacked relationship and adapted to enclose an extended end of said spindle, each of said units including its own non-rotatable leadscrew nut and a leadscrew threadedly seated therein, and movable relative thereto axially of said spindle upon being rotated, the leadscrews of different units having threads of different pitch that their rates of axial displacement will differ for a given speed of rotation, and operator-controlled indirectly actuated means selectively to connect said leadscrews to said spindle during its rotation.

5. The construction recited in claim 4 characterized in that each of said units includes a limit switch positioned as to be contacted and operated upon a predetermined displacement of said leadscrew and adapted to be included in an electrical circuit controlling the direction of rotation of said spindle.

6. The construction recited in claim 4 characterized in that each of said units includes a limit switch positioned as to be contacted and operated upon the return of said leadscrew to its initial position and adapted to be included in an electrical circuit controlling the connection of said leadscrew to said spindle.

7. In a tapping machine of the type including a body portion and a driven rotary spindle carried thereby for rotation and axial displacement relative to the body portion, motor means for effecting continuous rotation of the spindle, and means for selectively effecting axial displacement of the spindle at different rates during rotation of the spindle comprising a plurality of leadscrew units continuously carried by said body for alternative cooperation with said spindle, each including a stationary threaded part and a rotatable threaded part in engagement therewith, clutch means to engage said units individually to said spindle during its rotation, and operator-controlled means to actuate said clutch means to connect said units selectively to said spindle, characterized in that each of said units includes a clutch element rotatable with said rotatable threaded part and movable between spindle-engaging and non-engaging positions, and in that each of said units also includes an independently actuated cam to control the position of said clutch element.

8. In a tapping machine of the type including a body portion and a driven rotary tap-connected spindle carried thereby for rotation and for axial displacement relative to the body portion, motor means for effecting continuous rotation of the spindle, and means for selectively effecting axial displacement of the spindle at different rates during rotation of the spindle comprising a plurality of leadscrew units spaced therealong and each including a rotatable leadscrew having threads of a different pitch than that of the leadscrews of the other units and also including a fixed leadscrew nut seating said leadscrew, clutch means carried by each of said leadscrews including a transversely extending element rotatable with said spindle movable between spindle-engaging and non-engaging positions, a non-rotating cam abutting said element and movable to position it in spindle-engaging position, and control means to position said cam.

9. In a tapping machine of the type including a body portion and a driven rotary tap-connected spindle carried thereby for rotation and for axial displacement relative to the body portion, motor means for effecting continuous rotation of the spindle, and means for selectively effecting axial displacement of the spindle at different rates during rotation of the spindle comprising a plurality of leadscrew units spaced therealong and each including a rotatable leadscrew having threads of a different pitch than that of the leadscrews of the other units and also including a fixed leadscrew nut threadedly seating said leadscrew, clutch means carried by each of said leadscrews including a movable element engageable in one position with said spindle to effect its conjoint rotation and longitudinal displacement with the connected leadscrew, a cam concentric with said spindle and displaceable longitudinally of said spindle to position said element relative to said spindle, and operator-controlled means to position said cam.

10. An attachment for the conversion of a drill press or the like having a rotary axially displaceable spindle into a tapping machine, and motor means for continuously rotating the spindle to effect the drilling operation, said attachment comprising means for selectively effecting axial displacement of the spindle at different rates to perform various tapping operations using the same spindle, and including a plurality of individual and separable leadscrew units secured in stacked relationship and adapted to enclose an extended end of said spindle, each of said units including a non-rotatable leadscrew nut and a leadscrew threadedly seated therein, the leadscrews of different units having threads of different pitch so that their rates of axial displacement will differ for a given speed of rotation, clutch means operable during rotation of the spindle and carried by each of said leadscrews to connect it to said spindle to move it axially upon the rotation of said leadscrew, each of said units including its own remote controlled clutch-actuating means including fluid-pressure-operated means.

11. An attachment for the conversion of a drill press or the like having a rotary axially displaceable spindle into a tapping machine, and motor means for continuously rotating the spindle to effect the drilling operation, said attachment comprising means for selectively effecting axial displacement of the spindle at different rates to perform various tapping operations using the same spindle, and including a plurality of individual and separable leadscrew units secured in stacked relationship and adapted to enclose an extended end of said spindle, each of said units including a non-rotatable leadscrew nut and a leadscrew threadedly seated therein, the leadscrews of different units having threads of different pitch so that their rates of axial displacement will differ for a given speed of rotation, cooperating clutch means including a radially displaceable element carried by each of said leadscrews to connect it to said spindle, each of said units including its own clutch-actuating means to displace said element radially during spindle rotation and including electrically actuated means.

12. In a machine for tapping, a body, a rotary longitudinally displaceable tap-connected spindle, a reversible driving motor for said spindle, and means for selectively effecting axial displacement of the spindle at different rates during rotation of the spindle comprising a plurality of non-rotatable fixed leadscrew nuts spaced longitudinally along said spindle concentrically thereof, a sleeve leadscrew concentric to said spindle seated threadedly in each of said nuts, the threads of said leadscrews having different pitches to effect different rates of longitudinal displacement for a given rate of rotation, each of said leadscrews carrying a radially displaceable dog engageable with said spindle in its inner position to clutch the connected leadscrew to said spindle for conjoint rotation and longitudinal displacement at a plurality of specific points, a cylindrical cam encircling each of said leadscrews mounted for longitudinal displacement independently thereof and determining the radial position of said dog, and individual means to position said cams under the control of the operator.

13. The construction recited in claim 12, characterized in that the spindle has a plurality of longitudinally and transversely extending grooves, and said dogs each have cooperable groove-engaging teeth.

HERBERT J. WOOCK.

References Cited in the file of this patent

UNITED STATES PATENTS

| Number | Name | Date |
|---|---|---|
| 153,770 | Heap | Aug. 4, 1874 |
| 497,002 | Curtis | May 9, 1893 |
| 512,542 | Forbes | Jan. 9, 1894 |
| 999,701 | Costello | Aug. 1, 1911 |
| 1,190,763 | Joslin | July 11, 1916 |
| 1,200,053 | Tucker | Oct. 3, 1916 |
| 1,309,926 | White et al. | July 15, 1919 |
| 1,673,897 | Barnes | June 19, 1928 |
| 1,746,266 | Klausmeyer | Feb. 11, 1930 |
| 1,909,055 | Hageman | May 16, 1933 |